United States Patent
Hus et al.

(10) Patent No.: US 8,259,636 B2
(45) Date of Patent: Sep. 4, 2012

(54) METHOD FOR COMMUNICATING

(75) Inventors: Olivier J-M. Hus, Redhill (GB);
Matthew P. J. Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 258 days.

(21) Appl. No.: 12/664,435

(22) PCT Filed: Jun. 20, 2008

(86) PCT No.: PCT/IB2008/052444
§ 371 (c)(1),
(2), (4) Date: Dec. 14, 2009

(87) PCT Pub. No.: WO2008/155741
PCT Pub. Date: Dec. 24, 2008

(65) Prior Publication Data
US 2010/0172281 A1 Jul. 8, 2010

(30) Foreign Application Priority Data
Jun. 21, 2007 (EP) .................................. 07301140

(51) Int. Cl.
H04H 20/71 (2008.01)
H04L 12/28 (2006.01)
H04L 12/56 (2006.01)
(52) U.S. Cl. .......................... 370/312; 370/391; 370/431
(58) Field of Classification Search .................. None
See application file for complete search history.

(56) References Cited

U.S. PATENT DOCUMENTS

| 5,768,276 | A | * | 6/1998 | Diachina et al. ............... 370/432 |
| 2005/0129058 | A1 | | 6/2005 | Casaccia et al. |
| 2006/0209870 | A1 | * | 9/2006 | Lee et al. ........................ 370/432 |
| 2008/0159323 | A1 | * | 7/2008 | Rinne et al. .................... 370/431 |

FOREIGN PATENT DOCUMENTS

| EP | 1641302 A1 | 3/2006 |
| WO | 2005034397 A1 | 4/2005 |

OTHER PUBLICATIONS

Patricia Eusebio et al, "Management Scenarios for Multicast Groups in Enhanced-UMTS", Vehicular Technology C onference, vol. 4, Sep. 2004, pp. 3045-3049.
NEC, "Discussion of eMBMS Uplink Feedback Schemes", 3GPP Draft R2-071983, 3rd Generation Partnership Project, vol. TSG_RAN\WG2_RL2\TSGR2_45/Documents, May 1, 2007, 5 Pages.
Motorola, "Uplink Feedback for E-MBMS", 3GPP Draft R2-072025, 3rd Generation Partnership Project, vol. TSG_RAN\WG2_RL2\TSGR2_58/Documents, May 2, 2007, 3 Pages.
Motorola, "Uplink Feedback for E-MBMS", 3GPP Draft R1-070781_MBMS_Final 3rd Generation Partnership Project, vol. TSG_RAN\WG1_RL1\TSGR1_48/DOCS, Feb. 5, 2007, 2 Pages.

* cited by examiner

Primary Examiner — Xavier Szewai Wong

(57) ABSTRACT

The present invention relates to a method for communicating data in a telecommunication network comprising at least one primary station, and a plurality of secondary stations, comprising at a secondary station the step of transmitting a feedback signal to the primary station on a random access channel, wherein the feedback signal being of—a dedicated type related to at least one point to point link between the considered secondary station and the primary station, or—a common type related to multicast links, wherein, depending on the transmission, the second part being related to a first type of multicast link or to a second type of multicast link.

10 Claims, 1 Drawing Sheet

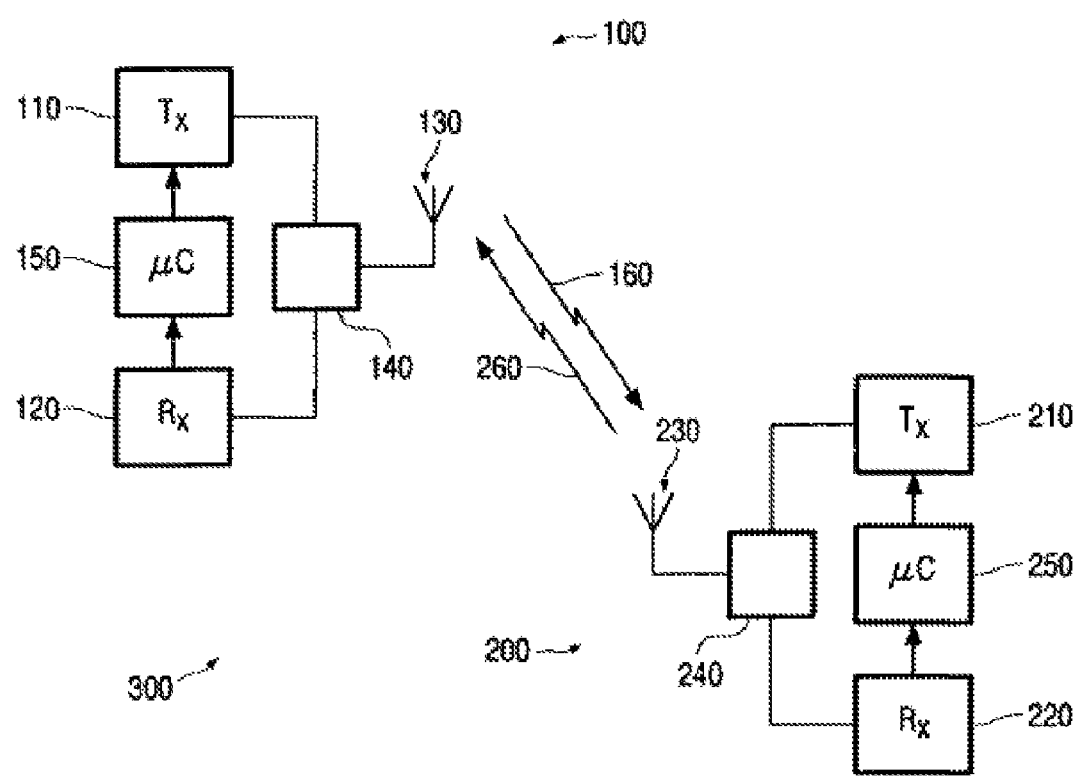

METHOD FOR COMMUNICATING

FIELD OF THE INVENTION

The present invention relates to a method for communicating data within a telecommunication network, and to a secondary station forming a telecommunication network arranged for carrying out the invention.

BACKGROUND OF THE INVENTION

A mobile telecommunication network, like a UMTS network comprises cells in which a primary station (or NodeB) communicates with a plurality of secondary stations (or User Equipments or UEs). The cells are controlled by Network Controllers.

In UMTS Long Term Evolution (LTE), eMBMS services (evolved MBMS) can be provided by a single frequency network (SFN) in which groups of cells are coordinated and synchronised to perform a simulcast MBSFN transmission from multiple cells, which is seen as a single transmission by a secondary station. MBSFN traffic can be either sent:
on a dedicated frequency layer, or
on a frequency layer shared with non-eMBMS services, where sets of "mixed cells" support both unicast and MBSFN transmissions.

As in UTRA Release 6 MBMS deployment, in LTE it will still be possible for single cells (SC) to send point-to-multipoint (PTM) eMBMS traffic: in LTE this will be transmitted on the DL-SCH (Downlink shared channel) channel and scheduled by the primary station for each individual cell.

It has been decided that this Point To Multipoint from Single Cell (PTM-SC) configuration will support a dedicated feedback channel (identical to the Unicast case) that will allow HARQ for acknowledging/Non-acknowledging (ACK/NACK) the eMBMS transmissions and for the eNodeB to schedule retransmissions on DL-SCH.

In MBSFN networks, eMBMS traffic will be transmitted point-to-multipoint from multi-cells (PTM-MC) on the MCH channel: this traffic will be scheduled by an MCE control entity (Multicast Coordination Entity). It has not yet been decided if this PTM-MC configuration will support a mechanism for feedback, whether on a dedicated or a common channel. Similarly, the possibility of providing multi-cell retransmissions (across the whole or part of the MBSFN network) is still an issue open.

As noted above, discussions are ongoing in 3GPP RAN2 on whether the HARQ mechanism proposed to support retransmissions for PTM-SC configurations may be extended to PTM-MC configurations: the benefit in terms of network efficiency is recognized, but the complexity of implementation makes the adoption of a suitable mechanism unclear.

In particular, MBSFN retransmissions may not be sent on the MCH channel, as MCH transmissions are scheduled on the MCCH: any MBSFN-wide retransmissions may be more appropriate for repetitions of services rather than isolated retransmissions. Isolated MBSFN retransmissions can on the other hand be sent on the DL-SCH in a mixed cell, where they can be scheduled by the mixed cell eNodeB.

In addition, coordination between eNodeBs will be needed in MBSFN networks in order to optimize coverage and throughput (modulation and coding scheme) in PTM-MC configurations. It will be advantageous for the network to have specific information on e.g. the MBSFN area edge users since they will experience poorer performance in the MBSFN area: since radio conditions between unicast operation and MBSFN operation can differ, feedback information from individual users on cell coverage or channel quality (e.g. physical layer measurement or CQI reporting) may be required specifically in order to assist cell planning and resource provisioning.

No technical proposal has yet been presented for the provision of individual or aggregated (common) feedback on the cell coverage and channel quality in PTM-MC configurations in MBSFN networks.

Furthermore, the feedback resources allocation for unicast UEs having not yet been decided, the eMBMS feedback resources cannot yet be specified either (for both PTM-SC and PTM-MC configurations), since for resource efficiency it is preferred to re-use the same mechanism for unicast and eMBMS traffic: the main concern with providing feedback is the additional overhead incurred in the uplink, and if a specific mechanism is agreed for unicast then it is likely to be selected too for eMBMS PTM-SC and/or PTM-MC, albeit with some adaptations for the multi-cells configurations.

The exact implementation details of the dedicated uplink feedback channel for unicast (and PTM-SC) have not yet been fixed, however the current line of agreement (in 3GPP TS 36.300) for unicast feedback is that some form of RACH resource partitioning will take place where a number of RACH resources (signature preambles known as random IDs) are allocated for random selection by UEs wishing to transmit feedback.

Generally however, there is no mechanism available yet for any type of common feedback (physical measurement, CQI, ACK/NACK for HARQ, etc) from multiple UEs in point-to-multipoint configurations in MBSFN networks for more than a few UEs: it has been proposed that point-to-point unicast feedback may be used in lieu of point-to-multipoint feedback for up to 10 UEs, but there is a consensus that for reasons of performance and interference, this scheme will not be scalable to a higher number of UEs in either PTM-SC or PTM-MC operation.

SUMMARY OF THE INVENTION

The aim of the invention is to address the bicephalic MBSFN configuration problem of requiring 2 types of feedback that are to be processed by 2 different entities:
Common CQI feedback from UEs in MBSFN reception is intended for the network coverage management and resource provisioning across MBSFN multi-cells
ACK/NACK feedback for retransmissions of MBSFN traffic is intended for the local scheduling of retransmissions on the DL-SCH of the mixed cell in which individual UEs are located.
Another aim of the invention is to provide a method for communicating in a network enabling to provide feedback easily in the MBMS context.

It is thus proposed to re-use part of the dedicated uplink feedback mechanism (which has been agreed for unicast) for common feedback in a mixed-cell in PTM-SC or PTM-MC operation, using implicit signalling to differentiate between the types of feedback: common channel quality (CQI) for coverage adaptation or dedicated ACK/NACK for HARQ retransmissions.

As a consequence, in accordance with a first aspect of the invention, a method is proposed for communicating data in a telecommunication network comprising at least one primary station, and a plurality of secondary stations, comprising at a secondary station, responsive to reception of a broadcast or multicast message, the step of transmitting a feedback signal to the primary station by means of a feedback resource of a random access channel, said feedback resource being allocated commonly for a set of secondary stations, wherein the feedback signal being either of
- a dedicated type related to at least one point to point link between the considered secondary station and the primary station, the feedback signal being addressed to the primary station, or
- a common type related to a multicast link, the feedback signal being addressed to a Network controller linked to the primary station.

Accordingly, the invention brings an extra degree of separation for the different possible types of eMBMS transmissions (i.e. the different possible types of eMBMS reception by the secondary stations) in the allocation of RACH resources by the network and in the use of RACH preamble signatures by secondary stations. Typically, this would be configured by the network provisioning 2 types of RACH resources for unicast or for PTM configurations, and by the secondary station signalling the type of feedback, as follows:

The network partitions RACH resources for:
- PTP random access feedback: used for unicast (as already specified)
- PTM-MC (or PTM-SC) random access feedback: used by UEs receiving MBSFN transmissions in PTM-MC configuration (or PTM-SC configuration, since the PTM reception mode is transparent to the UEs for MBSFN reception)

For PTM-MC RACH preamble signatures, the spare bit is used to indicate where the UE is intending on sending its feedback to, which is dependent on the cause for the feedback and on the type of feedback
- CQI feedback: intended for the network management function of the MCE control entity for MBSFN coordination of cell coverage and MCS adaptation
- ACK/NACK for HARQ: intended for the scheduling of retransmissions by the local mixed cell eNodeB Some benefits of the PTM-MC split feedback mechanisms are:
- Ignores the drawback that a UE doesn't know whether it is receiving PTM-SC or PTM-MC MBSFN transmissions (since MCH transmissions from multi-cells are coordinated and synchronised so that MBSFN reception is transparent to UEs) to aim the feedback directly at the intended target
- Provides a faster mechanism than existing dedicated PTP feedback:
  - In the dedicated PTP feedback, a series of low- and high-level signalling exchanges follows the random access by a UE, particularly for the resolution of UE identity necessary before the allocation of C-RNTI that is pre-required for subsequent RRC connection and NAS signalling
  - With the proposed common PTM feedback, on receiving a random access preamble for CQI, the network can immediately allocate a pre-configured message size for the CQI feedback without the necessity for the resolution of UE identity nor the establishment of RRC connection
    - Average or aggregated CQI information on common MBSFN reception is sufficient for cell planning, so knowing the identity of each UE is unnecessary
- Re-uses the existing range of RACH resources and allows provides flexibility for the network to perform dynamic partitioning of RACH resources according to the patterns in the feedback received:
  - Between dedicated (unicast) and common (PTM)
  - Between CQI for MBSFN and ACK/NACK for local mixed-cell retransmissions It is to be noted that one of the main interest of this invention resides in the implicit indication of a targeted type of feedback that allows a faster and more refined processing of feedback information by network entities:
- In traditional implementations of RACH, the partitioning of resources corresponds to a static physical mapping of signatures for an initial access request procedure that is received and processed in the same way for all secondary stations.
- In accordance with our invention, the partitioning of resources allow for different network entities to receive feedback information dedicated to their function faster, and process that feedback information accordingly.

BRIEF DESCRIPTION OF THE DRAWINGS

The present invention will now be described in more detail, by way of example, with reference to the accompanying drawing, wherein:

FIG. 1 is a block diagram of a network in which the invention is implemented.

DETAILED DESCRIPTION OF THE INVENTION

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the first radio station 100 takes place on a second channel 260.

A typical embodiment will consider a network implementation based on the key points of the invention described in the previous part:
- RACH resources are split between unicast and PTM random access preambles
- PTM random access preambles contain an implicit indication of the target for the feedback information to be transmitted:
  - CQI feedback for the coordination of MBSFN cell coverage and modulation and coding scheme adaptation
  - ACK/NACK for the scheduling of HARQ retransmissions by the local mixed cell eNodeB
- RACH Resources Provisioning
  - RACH resources are typically indicated on the BCH
  - When a MBSFN network is in operation
    - The RACH resources split may be performed as part of the MBSFN coordination, and dynamically adjusted according to the type of feedback or the number of UEs providing feedback RACH resources reserved for PTM-MC (or PTM-SC) operation may be indicated on the MCH The MCH may also configure specific parameters for the feedback information, such as CQI granularity or load Note that the description has so far considered the split for only RACH/PRACH channel (1.25 MHz), but several PRACH channels in a similar fashion PTM-MC RACH Resources & MBSFN Services Mapping One key aspect of a UE providing feedback on MBSFN reception is that the ACK/NACK for retransmissions will be specific to the MBMS service received by the UE. This may be less true for CQI feedback, since the same services will be deployed across a whole MSBFN multi-cell configuration, so that coverage and reception should be similar for all services.

The requirement of knowing which MBMS service is considered for ACK/NACK feedback (and appropriate retransmissions in the mixed cell) may be solved by:

Providing a direct mapping between RACH resources and specific MBMS services ID, so that UEs select a RACH preamble signature associated with the specific MBMS service ID for which they are preparing to transmit feedback Optionally, there could be a pool of RACH preamble signatures for each MBMS service If there are too many UEs trying to transmit feedback for the same MBMS service ID and therefore using the same RACH preamble signatures (potentially causing interference), a probability factor for when UEs can send RACH requests may be used in order to provide further randomisation. This is in line with the spirit of the invention where common feedback is provided, so that statistical knowledge of an average pattern is sufficient Leaving the pool of RACH resources free of any MBMS service ID mapping, and instead allocating an uplink message of sufficient size for the UE to transmit the MBMS service together with the ACK/NACK feedback information An example of the content of ACK/NACK feedback information could in this case be: MBMS service ID+the sequence number of the last packet received The transmission of CQI feedback would be possible with both options.

One extra bit may also be juxtaposed to the random ID selected, and used to indicate the cause for the feedback or the size of the message awaiting transmissions, so that the network can respond with an appropriate uplink resource allocation to individual UEs in subsequent messages.

Coordination of MBSFN

It is understood that coordination takes places between the MBSFN MCE and the eNodeBs in the mixed cells participating in the MBSFN transmission, which will be necessary in order to facilitate the reading (or the reception and subsequent signalling) of the relevant type of common feedback by the appropriate network entity. Cells coordination and configurations are however under discussion in 3GPP RAN2, and it is not in the scope of this proposal to present a model of operation at this time.

Similarly, the details of cell coverage adaptation following CQI feedback are outside the scope of this proposal.

For PTM-MC and PTM-SC operation, which is transparent to the UE, it can be noted that the reception of CQI feedback is beneficial in both configurations since the adjustment of transmission power can be done on a per cell basis, whether is it to improve area edge performance or general cell coverage.

Additionally, in a variant of the invention, coupling CQI feedback with ACK/NACK feedback for retransmissions for a specific service, which could be possible in a more complex implementation of this bicephalic proposal, would allow to perform targeted beamforming for more efficient retransmissions.

This invention may be implemented in mobile communication systems such as UMTS where communication devices make random access transmissions.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for communicating data in a Multicast-Broadcast Single Frequency Network MBSFN telecommunication network comprising at least one primary station, and a plurality of secondary stations, said method comprising at a secondary station, responsive to reception of a broadcast or multicast message, the steps of:

a) receiving one of a broadcast message or a multicast message at a secondary station in one of a point-to-multipoint from multi-cells PTM-MC configuration or point-to-multipoint from single cell PTM-SC configuration, b) selecting a Random Access Channel RACH preamble signature at the secondary station associated with a specific MBMS service ID in the received message in the case where the received message is a multicast message, c) reusing part of a dedicated uplink feedback mechanism to transmit a feedback signal to the primary station by means of a feedback resource of a random access channel (RACH), said feedback resource being allocated commonly for a set of secondary stations, d) provisioning two types of RACH resources by the MBSFN network dependent upon the type of feedback signal received from the secondary station, a first type of RACH resource allocated for unicast configurations and a second type of RACH resource allocated for PTM random access preambles wherein the feedback signal is one of a dedicated type related to at least one point to point link between the secondary station and the primary station, the feedback signal being addressed to the primary station, or of a common type related to a multicast link, the feedback signal being addressed to a network controller linked to the primary wherein said feedback signal is transmitted as a common type in the case where the received message is a multicast message, wherein said feedback signal is transmitted as the dedicated type in the case where the received message is a broadcast message wherein both the common type and dedicated type of RACH resources are dynamically adjusted by the MBFSN network according to the type of feedback from the secondary stations or the number of secondary stations providing feedback.

2. The method of claim 1, wherein the common type is dedicated signalling that is common to a plurality of secondary stations.

3. The method of claim 1, wherein the dedicated type is the feedback of an Automatic Repeat Request ARQ or Hybrid Automatic Repeat Request HARQ process.

4. The method of claim 1, wherein the common type of multicast link being a feedback for a broadcast or multicast traffic, and wherein it comprises a Channel Quality Indicator or CQI.

5. The method of claim 1, wherein the feedback signal is of the dedicated type if the broadcast or multicast message is a retransmission of a previously transmitted message.

6. The method of claim 1, wherein the feedback signal is of the common type if the broadcast or multicast message is a multicast message.

7. The method of claim 6, wherein the multicast message is common to a plurality of cells.

8. The method of claim 1, wherein the feedback signal comprises a field for indicating a feedback signature, and wherein at least one bit of this field is used to identify the type of the feedback signal.

9. The method of claim 1, further comprising the step of, at the primary station, transmitting the feedback signal to the Network controller if the feedback signal is of the common type.

10. A secondary station arranged for communicating data in a telecommunication network comprising at least one primary station, and a plurality of secondary stations, said secondary station comprising
- a receiver for receiving of a broadcast or multicast message,
- a transmitter for transmitting a feedback signal to the primary station by means of a feedback resource of a random access channel, said feedback resource being allocated commonly for a set of secondary stations, wherein the feedback signal being either of
- a dedicated type related to at least one point to point link between the considered secondary station and the primary station, the feedback signal being addressed to the primary station, or
- a common type related to a multicast link, the feedback signal being addressed to a Network controller linked to the primary station,
- means for selecting a Random Access Channel RACH preamble signature at the secondary station associated with a specific Multimedia Broadcast Multicast Services MBMS service ID in the received message in the case where the received message is a multicast message,
- wherein said feedback signal is transmitted as a common type in the case where the received message is a multicast message, and
- wherein said feedback signal is transmitted as the dedicated type in the case where the received message is a broadcast message.

* * * * *